US 008255696B2

(12) United States Patent
Florencio et al.

(10) Patent No.: US 8,255,696 B2
(45) Date of Patent: Aug. 28, 2012

(54) ONE-TIME PASSWORD ACCESS TO PASSWORD-PROTECTED ACCOUNTS

(75) Inventors: Dinei A. Florencio, Redmond, WA (US); Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 11/852,393

(22) Filed: Sep. 10, 2007

(65) Prior Publication Data
US 2008/0276098 A1 Nov. 6, 2008

Related U.S. Application Data

(60) Provisional application No. 60/915,251, filed on May 1, 2007.

(51) Int. Cl.
*G06F 21/00* (2006.01)
(52) U.S. Cl. ............ 713/184; 713/182; 713/183; 726/5; 726/8; 705/64
(58) Field of Classification Search .................. 713/155, 713/182–184; 726/5, 7, 8, 19; 705/64, 65, 705/70, 72–74
See application file for complete search history.

(56) References Cited

U.S. PATENT DOCUMENTS

| 7,228,438 B2 * | 6/2007 | Bushmitch et al. ........... 713/193 |
| 7,613,919 B2 * | 11/2009 | Bagley ........................... 713/155 |
| 2001/0056409 A1 * | 12/2001 | Bellovin et al. ................. 705/64 |
| 2005/0204172 A1 * | 9/2005 | Malcolm ........................ 713/201 |
| 2007/0234064 A1 * | 10/2007 | Nihei ............................. 713/183 |
| 2007/0245150 A1 * | 10/2007 | Lu et al. ........................ 713/184 |

OTHER PUBLICATIONS

Pashalidis, A. et al, "Imposter: A Single Sign-On System for Use from Untrusted Devices.", Nov. 29-Dec. 3, 2004, IEEE Communications Society, Globecom 2004, vol. 4, pp. 2191-2195.*
Florêncio, D. et al, "KLASSP: Entering Passwords on a Spyware Infected Machine Using a Shared-Secret Proxy", 2006, IEEE Computer Society, Proceedings of the 22$^{nd}$ Annual Computer Security Applications Conference, pp. 67-76.*

* cited by examiner

*Primary Examiner* — Jeffrey D Popham
*Assistant Examiner* — Daniel Potratz
(74) *Attorney, Agent, or Firm* — Lee & Hayes, PLLC

(57) ABSTRACT

Systems and methods facilitate secure one-time-password access to an account in a remote server from an untrusted client. The system consists of an intermediary component whose salient components are a proxy component, a web-server component, and an encryption/decryption component, and it preserves the characteristics of both the server and client. In a man-in-the-middle fashion, the proxy substitutes a one-time password entered at a login interface with a true password, and forwards it to the remote login server. True passwords are encrypted using a seed associated with user identifiers, and a list of one-time passwords is generated/updated and stored on media or transmitted to an electronic device. Substitution takes place by decrypting the one-time password with the seed used for encryption, ensuring the proxy avoids storing the true password.

18 Claims, 13 Drawing Sheets

REGISTRATION PAGE

One Time Password List

PRINT TABLE — 620

| | |
|---|---|
| 1 | V l x n P D M 4 |
| 2 | D z c n X Z K 8 |
| 3 | E y o a K O W 1 |
| 4 | G u a e E J I 3 |
| 5 | T d m q Q E P 5 |
| 6 | P z m l G U Q 5 |
| 7 | V z i m F L T 5 |
| 8 | T s d w D Y B 1 |
| 9 | W t k u F l P 2 |
| 10 | T q u m M X Y 5 |
| 11 | W j w z U D M 5 |
| 12 | G u b e J O Z 5 |
| 13 | J y o l X M N 6 |
| 14 | O u g o Y M H 9 |
| 15 | Q t j e G P D 9 |
| 16 | C r p k E P I 8 |
| 17 | U g w n M R D 9 |
| 18 | H o g e E T V 9 |
| 19 | D d x p R I F 9 |
| 20 | I a z x Q G C 1 |

FIG. 6

ONE-TIME PASSWORD ACCESS TO PASSWORD-PROTECTED ACCOUNTS

CROSS REFERENCE TO RELATED APPLICATION

This application claims the benefit of U.S. Provisional Application Ser. No. 60/915,251, entitled "SYSTEM TO ALLOW ONE-TIME PASSWORD ACCESS TO PASSWORD-PROTECTED ACCOUNTS" and filed on May 1, 2007, the entirety of which is incorporated herein by reference.

TECHNICAL FIELD

This invention relates to management of computing and information systems, with emphasis in security of authentication credentials for access to remote servers.

BACKGROUND

As access to services is pushed online, the scope of sensitive information that a user must protect broadens. Among this sensitive information, passwords as well as credit card numbers (CCNs) and social security numbers (SSNs) are the most prominent examples. Users increasingly find themselves in the position of having to enter sensitive information on untrusted machines, with the ensuing risk of compromising that information. By logging in to email accounts, bank and brokerage accounts, employee benefits sites, dating and social networking sites from an untrusted computer, users are at risk that a keylogger or other spyware will capture the password and gain unauthorized access. Users who reserve a hotel or rental car using a credit card number risk leaving all the ingredients necessary for credit card fraud on the untrusted computer. In addition, many banks use social security numbers as userids, and require these numbers for some transactions. Thus, these SSNs are particularly sensitive as knowing someone's SSN is a key component of identity theft.

Public or shared computers, like those found in internet cafés or kiosks, should be assumed untrusted, and due to poor security policies, risky browsing habits, installing executables of both unknown and known origin, home computers also can easily be infected with spyware. Key and mouse logging software are also common exploits: a malicious individual or entity may install such software and record keyboard and mouse events—including passwords—entered by an unsuspecting user. In summary, any given computer should be assumed untrusted unless a competent and knowledgeable individual has set it up and maintains it.

The combination of an ever increasing number of services that have to be accessed in password-protected remote login servers, with the increase of security-compromised computers, results in the need for systems and methods to access those services securely, without compromising a user's sensitive information. Existing approaches that address this issue fall essentially into three broad categories. (1) Server-based methods of authentication other than passwords. Examples include on-screen keyboards, two-factor authentication, and challenge-responses systems. These methods have to be adopted by the providers of the services, by introducing major changes to the server in order to provide the alternative method to authenticate the users. In addition, these methods do not provide means for entering sensitive information like CCNs and SSNs. (2) Password management systems. These systems store the sensitive information on either the client or an in-the-cloud server. In the latter, this server delivers the sensitive information directly to the desired destination server on the user's behalf. Nevertheless, storing sensitive information in an in-the-cloud server introduces a new vulnerability: If an attacker gains access to the user's account at this server, access to any sensitive information stored in the server is granted. Further, a server storing the sensitive information of hundreds or thousands of users can itself become a target for attacks. (3) Existing one-time-password systems. In such systems, instead of a single, re-usable password being assigned to a user, a server issues a number of passwords that the user can employ each at most once, e.g., one-time password, to gain access to the server. Typically, the server storing the one-time passwords is the same as the server authenticating the user.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The subject specification addresses the problem of enabling a user to enter sensitive information on an untrusted computer. In addition, the specification shows how a user can enter one-time versions of any sensitive information that has to be typed at untrusted computers. Thus, the user can have one-time password access to any remote login server, with no need to (i) make changes to existing remote login servers or merchant web pages, (ii) or make changes to the browser or install any software applications at the untrusted client computer. In addition, the user can generate one-time versions of other sensitive information such as credit card numbers or social security numbers without requiring any change from the servers and websites with which the users interacts.

System(s) and method(s) described herein are based on a man-in-the-middle approach where an intermediary component, via a proxy component, is responsible for all transactions between a client and a server. The intermediary component does not know or permanently store sensitive information. The intermediary component relies on encryption of true sensitive information to generate one-time information, which is used to login in a remote server from an untrusted client (such as a computer infected with spyware, or running keylogger and screen capture scripts uploaded) without risk of compromising the true sensitive information. As an example, a password to access a particular service is first encrypted, producing a list of one-time passwords. Similarly, passwords to other services, CCNs, SSNs, and other sensitive information are encrypted and a list of one-time information is generated. One-time passwords (OTPs) can be produced by encrypting an original password multiple times with disparate encryption keys for each encryption instance, and can then be assigned to a user. Subsequently, the OTPs can be erased from the encryption engine/server, which can keep only the encryption key utilized to generate each encryption instance. The user receives and securely holds those one-time information lists for use in untrusted clients. It should be appreciated that a list of one-time information allows the user to have replay-resistant access to password protected accounts. When login in a remote serve is necessary, the one-time information (e.g. passwords, CCNs, SSNs) is provided to the intermediary component which then decrypts the one-time sensitive information typed at the untrusted computer thus producing the true sensitive information (e.g., the original password), and forwards it to the remote login server. With the system(s) and method(s) described herein, true sensitive information is neither typed in the clear at the untrusted computer nor displayed nor downloaded to the compromised client environment; only an encrypted instance of the true password is typed at the client, and that encrypted version cannot be re-used in subsequent logins.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

BRIEF DESCRIPTION OF DRAWINGS

FIG. 6 illustrates an actual user interface displaying a one-time password table.

DETAILED DESCRIPTION

Figure 1:
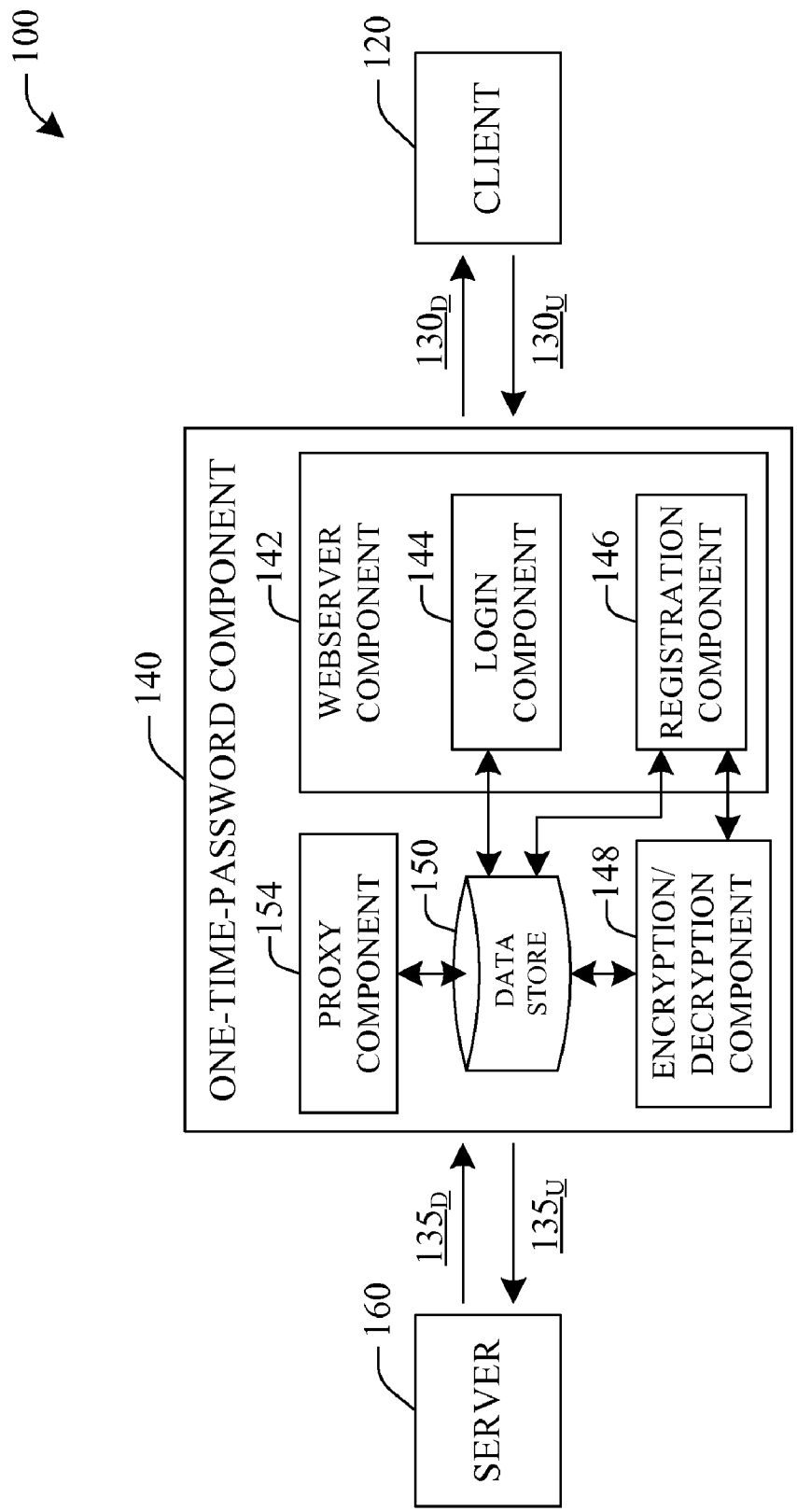
FIG. 1 is a block diagram of a system that facilitates one-time password access to a remote server.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, in this application the word "password" refers to an alphanumeric keyword that allows access to a remote server for the purpose of accessing information or processing a service. Thus, in addition to the common interpretation of a computer account password, such as those used to access web-based email services, establish a virtual private network (VPN) connection or remote connection to a high-performance computational platform, "password" is also interpreted as, but not limited to, credit card numbers (CNNs), social security numbers (SSNs), birth dates, passport numbers, or substantially any other pre-defined character sequence.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

FIG. 1 illustrates a computer-implemented system 100 that allows one-time password access to a remote password-protected server 160. The embodiment 100 comprises a client 120, a one-time-password component 140, and a remote password-protected server 160 to which the client 120 intends to establish a secure connection without compromising authentication credentials (e.g., a password for access to a web-based email server, a bank web-based service, a repository of proprietary information). System 100 is based on a man-in-the-middle approach, with one-time password component the intermediary. Client 120 can be assumed to be untrusted, e.g., its security status or features cannot be verified or assessed. Typically, client 120 can be a web-based application that requires remote login into a server (e.g., server 160) to (i) employ the features of the application—on-line gaming, web-based email; or (ii) obtain a service, such as financial transaction, a flight itinerary revision/confirmation, a reservation of a book in a public or school library. In an aspect, system 100 can be employed by roaming users seeking password-protect access to a remote server from an untrusted computer. The OTP component 140 comprises a proxy component 154, a webserver component 142, and an encryption/decryption component 148, and provides system 100 with man-in-the-middle (MITM) characteristics. Details of OTP component 140 and its functionality are discussed next.

Webserver component 142 can comprise a login component 144 and a registration 146. The latter allows client 120 to generate a set of one-time passwords. In a first interaction with OTP component 140, client 120 accesses registration component 146 and provides unique identifiers for the account/service a user of client 120 is interested in accessing. Typically, login information to the account is sufficient to uniquely identify a user: universal resource locator (URL) or IP (internet protocol) address of remote login server (e.g., server 160), and account userid. As an example, userid can be zohnDoe37@hotmail.com and www.hotmail.com can be the URL, or SavvyInvestor@fidelity.com and www.fidelity.com. In addition, user discloses the true password (passwd) to the account in the remote server (e.g., server 160). It should be appreciated that such disclosure of sensitive credentials must take place in a trusted computer, to avoid compromising those credentials. Registration component 146 then assigns the user a randomly chosen seed number (k), and stores it with use r d and URL of the remote server (e.g., server 160) in data store 150. Seed k can be uniquely assigned to the client identifiers userid and URL of the remote server, e.g., k can be a key for the user identifiers. It should be appreciated that k is not a sensitive credential without an encryption algorithm $E(k,s)$, where s is an array of symbols. Registration component conveys k and passwd to encryption/decryption component 148.

Encryption/decryption component 148 generates a set of N one-time passwords encrypting the true password according to an encryption algorithm $E(k,s)$. In an aspect, such encryption algorithm can be cast as a one-to-one and onto mapping of symbol arrays onto itself. A valid mapping can be a pseudorandom permutation $P(k,s)$ of symbol arrays based on seed k. Using a set of N seeds (or encryption keys), given by $\{k, k+1, \ldots, k+N-1\}$, N permutations are generated: $\{P(k, passwd), P+1, passwd), \ldots, P(k+N-1, passwd)\}$. It is noted that instead of $f(k)=k+n$ ($n=1, 2, \ldots, N-1$) substantially any function of k $[g(k)]$ that generates a new seed is suitable. Each of these permutations constitutes an encryption instance of the true password (passwd), and can be assigned to a one-time password. It is noted that encryption/decryption component 148 has access to the decryption algorithm $D(k,q)$ for encryption $E(k,s)$, where q is an encrypted array of symbols. Thus, the true password is recovered from the identity $D(k,E(k, passwd))=passwd$. It should be appreciated that once encryption/decryption component 148 determines an encryption algorithm $E(k,s)$ (e.g., a mapping) for the true password, encrypts it, and communicates it to the user, both the encrypted passwords and the true password can be disposed. Thus, permanent storage (e.g., in data store 150) by OTP component 140 of the encrypted and true passwords is not warranted/necessary as long as the decryption algorithm $D(k, s)$ is retained. It should be appreciated that the encryption key k alone does not constitute substantially sensitive information, as it is only useful when combined with a password encrypted as described supra.

The encryption/decryption nature of the generation of true password mitigates attacks on OTP component 140, as obtaining the decryption algorithm alone does not provide any advantages regarding generation of the true password. It is noted, nonetheless, that vulnerability is highest at the registration stage and when the password is decrypted in login steps (see below). In such instances the true password is temporarily stored in data store 150 and manipulated by encryption/decryption component 148. To diminish the opportunities for a successful attack on OTP component 140, with the ensuing compromise of sensitive information, temporarily stored credentials are XORed with a client-specific salt while in data store 150. Calls to such data store are executed as stored procedures rather than general queries. In an aspect, database connection strings and other important path variables can be loaded from the Data Protection API (application programming interface) provided by Microsofti® Windows®. Below, handling of the OTP list and possible mappings are discussed.

It should be appreciated that the registration procedure described above (involving registration component 146 and encryption/decryption component 148) can be carried out for an arbitrary number of remote servers. Each time a new server is to be accessed securely through OTP component 140, a user of a client (e.g., client 120) can register it and obtain a list of one-time passwords.

Once a list of one-time passwords has been generated, login component 144 can accessed by a client (e.g., client 120) intending to access a remote, password-protected server (e.g., server 160). The client is requested to provide the registered user identifiers—userid and server URL—for the server that access to is intended, in order to retrieve the associated encryption seed k. (Identifiers are stored in the OTP component 140 in, e.g., data store 150, in conjunction with the seed k.) Then, the client is requested to supply a one-time password from the list of generated (registered) passwords. For login instance m, the m-th instance in the OTP list is employed, e.g., $E(k+m, passwd)$ is provided. Encryption/decryption component 148 decrypts $E(k+m, passwd)$ and thus passwd becomes available for submission to the intended remote login server (e.g., server 160). It should be appreciated that since the key employed in the encryption of the true password is directly related to the login instance, one-time passwords afford client 120 a replay-resistant access to password protected accounts without infrastructure changes to the remote server 160. After decryption, the login URL for the remote server 160 is then filled in with the actual userid and one-time password $E(k+m, passwd)$ or an arbitrary string of characters. (See below.) It should be noted that keyloggers as well as screen-capture scripts are mitigated by this approach. The login process is managed by proxy component 154, as discussed next. It is noted that a user might be prompted to deliver the one time passwords in some alternative order. As an example, instead of requesting for the m-th OTP on the list for the m-th login, the proxy might prompt for the n-th OTP, with n>m, until all remaining active one-time passwords are exhausted.

Proxy component 154 relays communications between client 120 and server 160. In an aspect, to accomplish such relay, client 120 establishes proxy component 154 as a proxy server, by setting the IP address thereof. It should be appreciated that implementing such a setting does not require privileges beyond those ordinarily available to client 120 (e.g., a user interfacing with client 120 does not need administrator privileges to set proxy component's IP address), or installation of a custom application or modification of client 120. In an aspect, when client 120 is a web browser such as Internet Explorer® or Firefox, setting a proxy IP is done in the "Connection Setting" tab of the options menu. It should also be appreciated that proxy component 154 can be implemented as a reverse proxy, and yet no changes are needed to be made to browser setting.

Communication that takes place amongst client 120 and one-time-password platform 140 (link 130$_U$) and one-time-password platform 140 and a server 160 (link 135$_U$) is termed herein "uplink communication" or "uplink." Similarly, "downlink communication" or "downlink" refers herein to communication between server 160 and OTP platform 140 (link 135$_D$), and OTP platform 140 and client 120 (130$_D$). In case of secure uplink and downlink communication (e.g., secure socket layer (SSL), transport socket layer (TSL)), proxy component 154 can act as a certificate authority (CA), with all certificate information appearing as being issued by the proxy component 154. In an aspect, when client 120 is an internet browser, a user of client 120 may get warnings indicating proxy component 154 is the certificate authority (CA). Similarly, if proxy component 154 is a reverse proxy, the user gets CA warnings unless the proxy is trusted, in which case no CA warnings are issued. Additional warnings are possible to be received in case proxy component 154 is not a reverse proxy. User can acknowledge the warnings by clicking on a button designed for such purpose (e.g., "OK" button) in the warning message environment, and then proceed with the session; or user can explicitly declare proxy component 154 as a trusted issuer of certificates for client 120. It should be appreciated that in certain computers, such as an internet kiosk computer, the user may not have privilege to declare proxy component 154 as a trusted CA.

Additionally, proxy component 154 manipulates login information. As discussed above, client 120 requests a server login URL and provides a userid, such request and the response to it from server 160 flow through proxy component 154. The requested server login URL contains both userid and password form fields. Proxy component 154 populates these fields before relaying them to client 120. The userid field is populated with the actual userid identifier that client 120 provided to OTP component 140 at the time of registration, and it is stored in data store 150. In turn, the password field is populated with an rogue string of characters, or with the one-time password corresponding to the login instance according to the generated list of one-time passwords. Substitutions are accomplished with scripting commands available in proxy component 154. It should be appreciated that the password field of the server login URL delivered to client 120 is filled in order to stand scripting checks deployed to prevent submission of a login form with empty password fields. Client 120 (or a user interfacing with client 120) submits the server login form. Such request flows through proxy component 154, and on this step the proxy component 154 replaces the value in the password field with the true password obtained through decryption of the one-time password submitted at login time. The true password (XORed with a client-specific salt) is retrieved from data store 150. Replacement of the password is effected by a scripting command available in proxy component 154, which allows editing of requests as they are communicated from client 120 to server 160. This last intervention of proxy component 154 allows client 120 to access server 160 securely, via a one-time password. Subsequently, passwd XOR client-specific salt is deleted from data store 150, ensuring that no permanent record of a true password is kept in the OTP platform 140. Other than to broker the communication between client 120 and server 160, and maintain, if necessary, a SSL connection to client 120 and another to server 160, there is no further intervention of proxy component 154 after the login is established. In an aspect, a debugging proxy can be used to provided scripting commands necessary for modification of client (e.g., client 120) requests and responses of server (e.g., server 160). Exemplary proxies are Fiddler, Paros, and BurpSuite. Exemplary reverse proxies are Microsoft*) Internet Security and Acceleration (ISA) Server, and Fastream IQ Reverse Proxy.

It should be appreciated that the functionality of one-time password component 140 can be modified to handle (i) a temporary password with a finite lifetime, e.g., the password is valid up to an expiration date/time, or (ii) a temporary password valid for a specific number of instances R (with R a natural number greater than one). In an aspect, the validity of a temporary password can be specified by encryption/decryption component 148, which can generate the password. It is noted that substantially any issuer of a temporary password can have privileges to specify the longevity of the temporary password. Then, the decryption algorithm can be redesigned so that seed k, assigned to remote server and login account identifiers, remains unchanged for a number of instances R or for the lifetime of the generated password. It should be appreciated that other modifications can be adopted in order for one-time password 140 to handle temporary passwords; such other modifications are within the scope of the subject application.

Figure 2A:
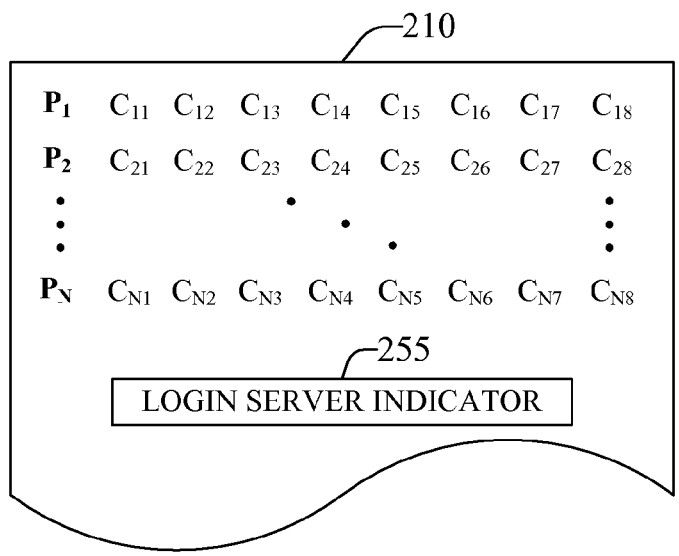
FIGS. 2A, 2B, and 2C illustrate a one-time password list and possible handlings of such list.

FIG. 2A illustrates an exemplary one-time password list 210. N one-time passwords $P_1$-$P_N$ are included in list 210, and each password $P_J$ contains mapped characters $C_{J1}$-$C_{JN}$ of the characters of the true password. In an aspect, the mapping is random, as discussed above. In another aspect, the mapping is such that each characters in the true password (passwd) are mapped to a K-digit number (e.g., K=2). The latter can provide strengthening of the one-time password, and it can reduce confusion of similar-looking characters. As an example, a true password such as "snoopy2" can become "23762544452604." It is noted that list 210 contains a login server indicator 255, which indicates a user interfacing with client 120 which remote server the one-time passwords are valid. Indicator 255 can be text, explicitly indicating the server login URL, or it can symbolic (e.g., an image, uploaded or selected from a pool of images by client 210 at the time of registration).

It is noted that when passwords are credit card numbers, the mapping of digits employed to generate one-time credit card numbers needs to be consistent with credit card numbers syntax. In particular, the one-time credit card numbers need to satisfy parity check, e.g., the last digit of the one time number can be determined according to Luhn's algorithm. A valid check number can allow the one-time credit card number to stand validity checks applied by a remote login server (e.g., server 160).

Figure 2B:
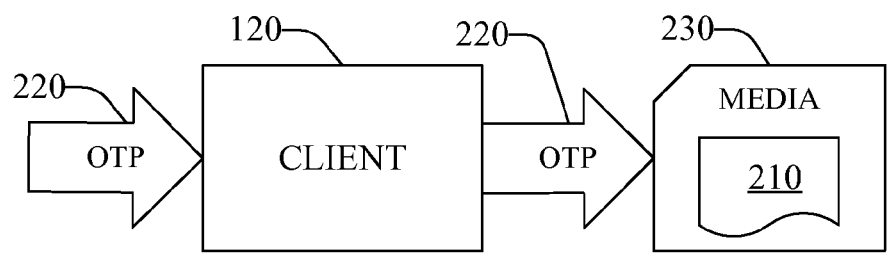

Referring to FIG. 2B, downloading of a one-time password list 210 to media 230 is illustrated. Once a one-time password 220 is generated, e.g., in a registration state using registration component 146, client 120 can download a list of OTPs to media 230. In an aspect, the typical download is to print the OTPs, in which case the media is paper. In another aspect, the OTPs can be downloaded to a flash memory drive (e.g., memory stick or a memory card), or to a CD or DVD. An advantage of this media is that the OTP list can be retrieved in electronic devices such as cell phones, cameras, MP3 players, etc. In yet another aspect, the list of OTPs can be downloaded to a flexible smart-paper device, or a portable flexible display (e.g., thin-film polymer technology).

Figure 2C:
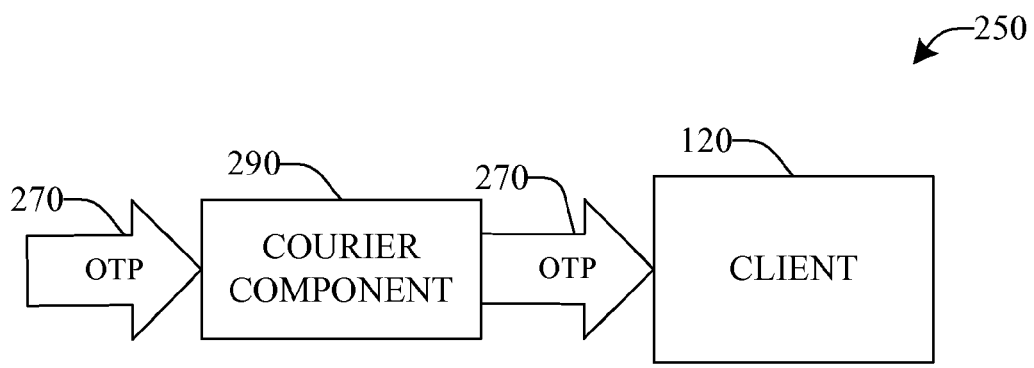

A system 250 in which a one-time password is transmitted to an electronic courier device 290 is illustrated in FIG. 2C. Once a one-time password is generated, it can be transmitted to portable, or stationary, courier device 290 that can store it and/or transmit it to client 120. It should be appreciated that transmission of the one-time password can be wireless, such as in short message service (SMS). In an aspect, courier device 290 can be an electronic device that uploads the OTP list from media 210. Exemplary devices can MP3 players, cameras, key fobs, etc. In another aspect, a courier device can be a cell phone, an MP3 player, a pager, a portable flexible display with wireless reception, a pocket PC, etc. An advantage of using system 250 is that client 120 can emancipate from returning to a trusted computer to generate a list of passwords, as it would be the case if using a paper as media. To become independent from the trusted computer, client 120 can enter an OTP from an untrusted machine to a decryption/encryption component (e.g., component 148) which decrypts the OTP, generates another series of OTPs, and sends it to courier device 290. It should be appreciated that by relying in courier device 290, client 210 needs to disclose a true password to a trusted computer only a first time, as the true password employed in such first time allows an encryption/decryption component to create an encryption/decryption, E(k,s)/D(k,q) pair which permits generating a true password on demand. Thus, client 210, in system 250, can become independent of a trusted environment.

Figure 3A:
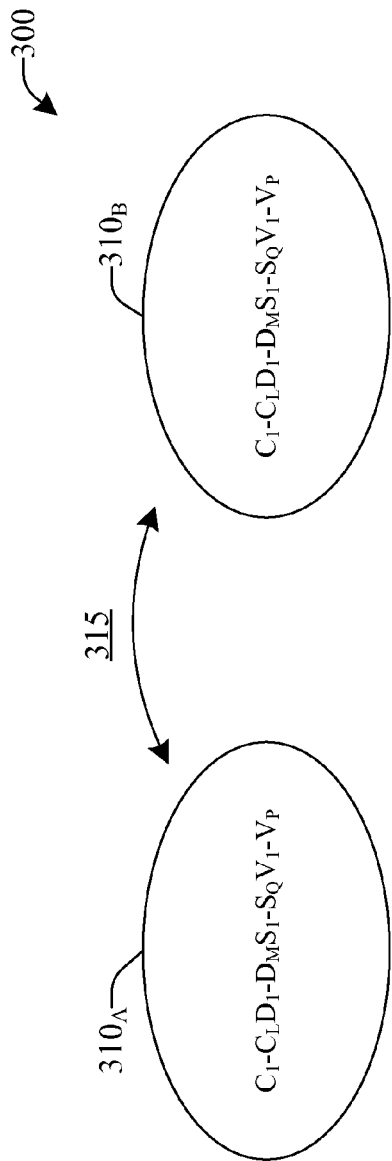
FIGS. 3A and 3B are diagrams of mappings employed to generate one-time passwords.
Figure 3B:
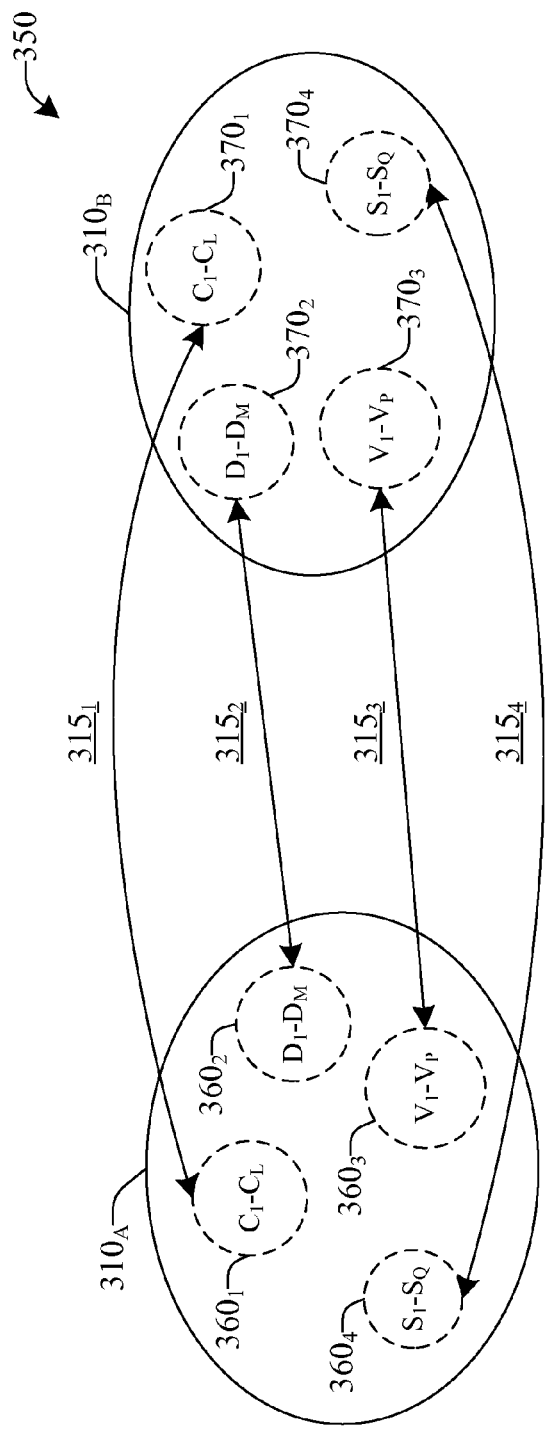

FIG. 3A illustrates the type of mapping employed when encrypting a true password. As shown in diagram 300, a set $310_A$ of all possible password keys, e.g., $C_1$-$C_L$, $D_1$-$D_M$, $S_1$-$S_Q$, $V_1$-$V_P$, is mapped onto itself (set $310_B$) via a mapping 315. In an aspect, C, D, S and V can correspond, respectively, to the 26 lowercase characters, 26 uppercase characters, 10 digits, and P special characters. In another aspect, mapping 315 can be a permutation P(k,s), as described above, which is a one-to-one and onto mapping (e.g., invertible). It is noted that in practice such a mapping can generate confusion since some characters can be difficult to distinguish, e.g., the lower case letter "l" and the digit "1." To address such difficulty, a constrained mapping (e.g., permutation) is employed as illustrated in FIG. 3B. The set of all possible keys is divided into subsets, e.g., $360_1$-$360_4$, of related keys (e.g., digits, lowercase characters) and the mapping is restricted to within each of these subsets ($315_1$-$315_4$) to itself (e.g., $360_2$-$370_2$). Thus, a true password such as "snoopy2" which results in "jwllvm0" as OTP, can pose no confusion since it is known that numbers map onto numbers; thus the last key of the OTP is a digit instead of a capital letter. Similarly, there is no ambiguity as to whether the third and fourth characters correspond to lowercase "l" or number "1." It should be appreciated that in adopting a constrained mapping there is some loss of information to attackers, e.g., spyware. By knowing the mapping is constrained, an attacker can determine which type of character/symbol set the each key of the password belongs to; thus, in the mapping of "snoopy2" above the attacker can know that the true password contains 6 lowercase characters and one digit in the last key. Yet, it is noted that such loss of information fails to compromise the true password significantly: (i) the attacker must have access to the nature of the mapping, (ii) a brute-force offline attack on the login account can continue to be of limited success, as constrained mapping reduces the search space from $82^7$, when it is assumed 52 lowercase/uppercase characters, 10 digits and, and P=20 special characters, to $10 \cdot 26^6$, not a serious reduction when a low threshold number of login attempts (e.g., 3) is determined by the login remote server. In yet another aspect, a password key can be mapped to a disparate set of constituent characters, e.g., $C_1$-$C_L$, $D_1$-$D_M$, $S_1$-$S_Q$, and $V_1$-$V_P$ can all be mapped to the set of all two digit numbers: $N_{00}$-$N_{99}$.

Figure 4:
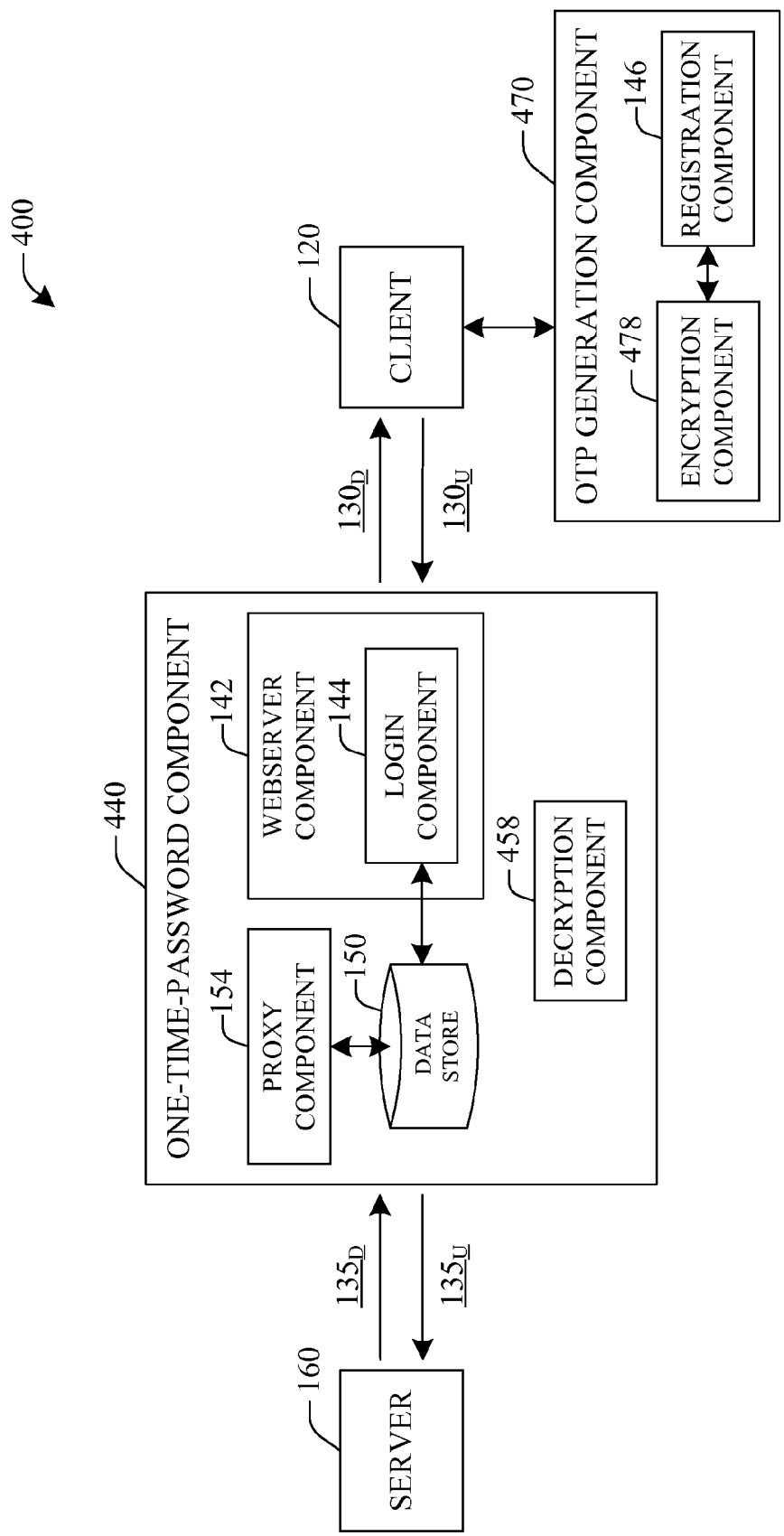
FIG. 4 is a block diagram of a system that facilitates access to a secure remote server using a one-time password.

FIG. 4 illustrates a system 400 to gain access to a secure remote server 160 using a one-time password. Embodiment 400 comprises a one-time password component 440, a one-time password generation component 470, and a client 120 and a server 160. Communications take place through uplinks $130_U$ and $135_U$, downlink $130_D$ and $135_D$ via proxy component 154. One-time password component 440 comprises proxy component 154, data store 150, webserver component 142, and a decryption component 458. Such components functionality is substantially the same as in system 100. It should be appreciated that in system 400, webserver component 142 comprises a login component 144, without a registration component. One-time password generation component 470 can comprise an encryption component 478, and registration component 146. In terms of encryption, component 478 operates substantially in the same manner as component 158. Registration component 146 is the same component as in system 100. It should be appreciated that the functionality of system 400 is substantially the same as that of system 100. An advantage of system 400 is that client 120 discloses a true password (passwd) to component 470, which is dedicated to registering a client (e.g., client 120) via registration component 146, and generating a one-time password through encryption component 478. Component 478 can be deployed in a trusted environment, and thus vulnerability of the true password can be decrease with respect to system 100, wherein component 140 can be deployed in an untrusted environment. It should be appreciated, nonetheless, that to seize the advantages of employing proxy component 154 substantially as described above, decryption algorithm (or decryption private key) D(k,q) has to be transmitted, via uplink $130_U$, to one-time password component 440 in addition to transmitting a one-time password. It is noted that decryption component 458 can know D(k,q) beforehand, in that case seed k has to be transmitted to the one-time password component.

In an aspect, OTP generation component can be embodied in a cell phone which can perform the encryption/computation of OTP. (Such encryption can be actuated with a special key in the phone.) Transmission of user identifiers, one time passwords and decryption algorithm/seed can be accomplished wirelessly from the cell phone to the one-time password component 440. Alternatively, or in addition, OTPs can be rendered at the phone screen and manually entered at client 120 by a user.

It should be appreciated that client 120 can also be a site or service specific application, such as a program that interfaces a user in a bank ATM with the financial institution, or the self-check-in kiosk at airports (while no password is required for such check-in, important personal information, e.g., full name, date of birth, passport number, is required in the case of international flights, is requested). In such specific site/application, client 120 can offer an alternative OTP procedure for entering sensitive information. In an aspect, the application allows a user interfacing with it to engage a proxy component (via entering a proxy IP address) and to select which fields should be considered one-time information fields, e.g., while a user may not care about his middle name, he/she may be particularly concerned with date of birth, last name, and passport number. Once a proxy component is established and the one-time information fields are determined, the sensitive information is treated as described herein in relation to passwords. In the case of information fields a more aggressive encryption involving images and sounds can be employed as long as the client 120 allows such encrypting.

Figure 5:
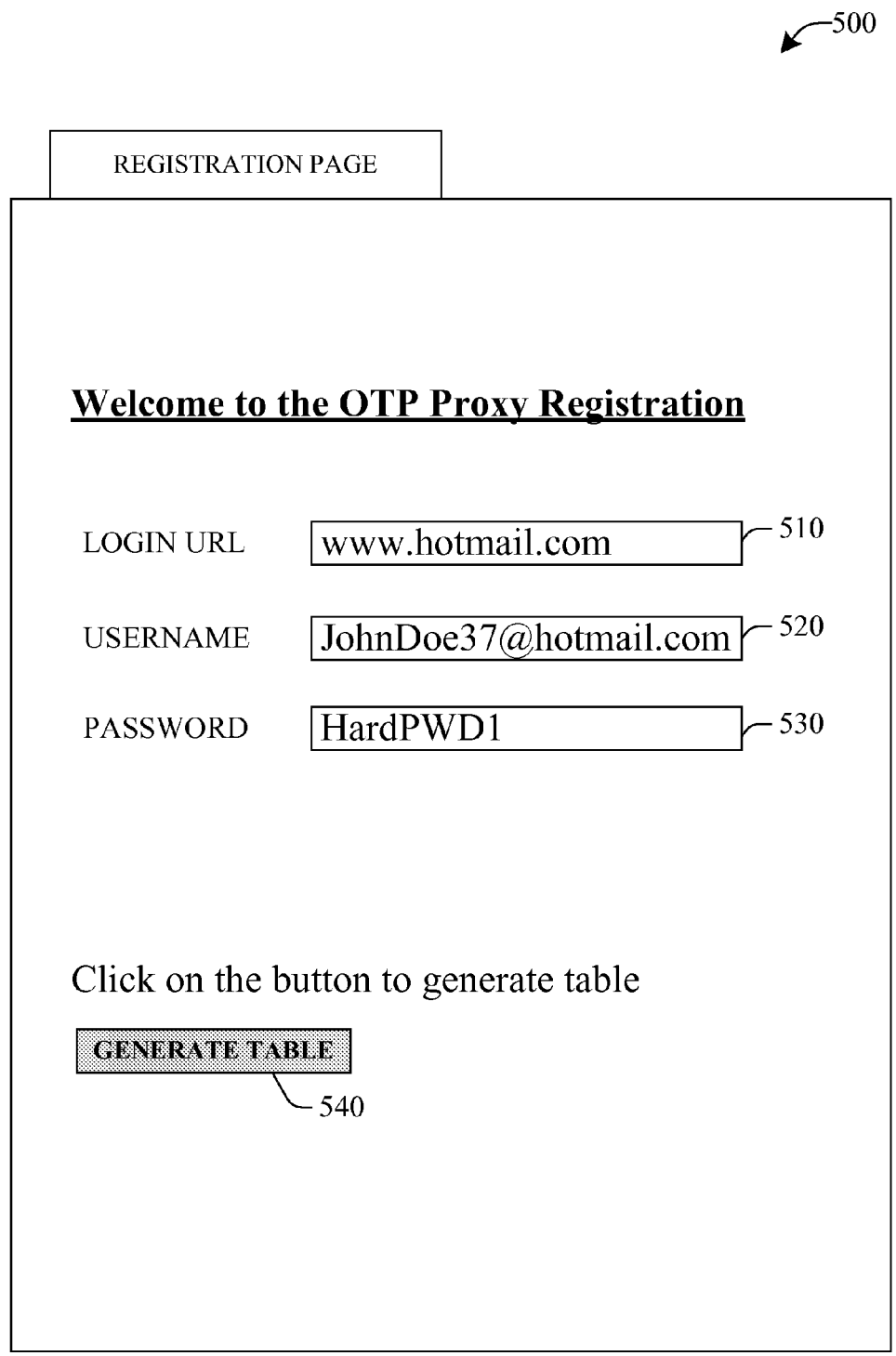
FIG. 5 illustrates an actual one-time password system registration user interface.

FIGS. 5-7 illustrate the registration and login user interface for an actual implementation, in Internet Explore®, of a system that allows one-time password login into a remote server. An actual registration interface 500 is shown in FIG. 5. A user is prompted to fill in a login server URL field 510, a username field 520, and a password field 530. As the true password is disclosed, registration 500 is to proceed in a trusted environment. After all fields are filled, a table of one time passwords can be generated through button "Generate Table" 540. An actual, generated table 610 is presented in a new graphic interface 600 as illustrated in FIG. 6. In the actual implementation shown in FIG. 6, N=20 one-time passwords are generated. Interface 600 presents a user with the option to print the OTP list. In another aspect, an interface can present alternatively, or in addition, other options to the user for downloading the table to media (see FIG. 2).

Figure 7A:
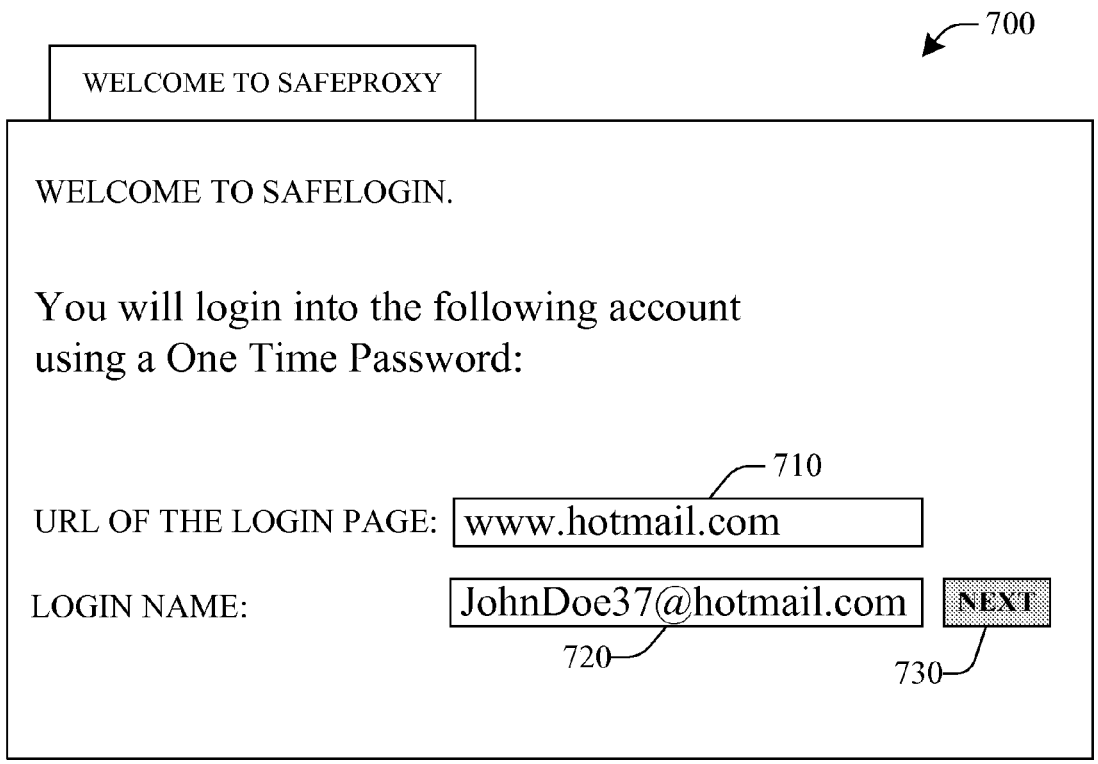
FIGS. 7A and 7B illustrate an actual user interface for login to a remote server using a one-time password.
Figure 7B:
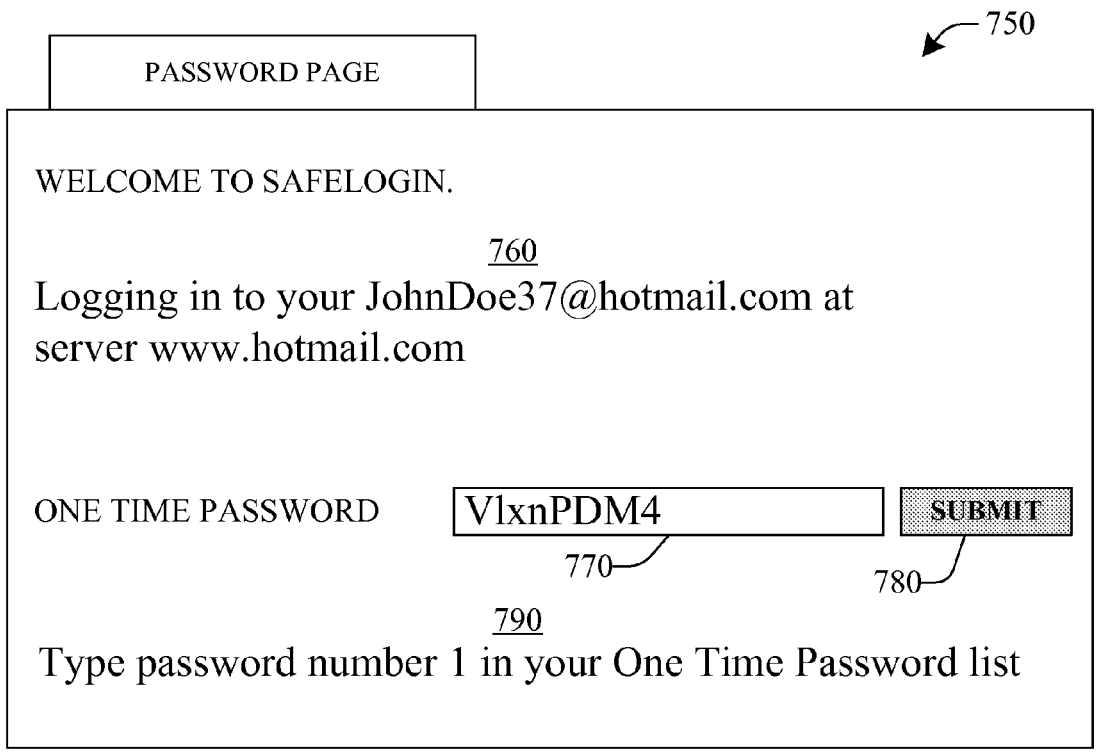

FIGS. 7A and 7B illustrate an actual user interface used to login to a remote server using a one-time password. Interface 700 is illustrated in FIG. 7A, wherein a user is prompted to fill in user identifiers: URL of remote server (710), and userid (720), as discussed above. Upon filling in this information, user proceeds with the login by clicking in the "Next" button 730. The latter action leads to interface 750 illustrated in FIG. 7B. An indicator of the userid and the remote server URL is displayed in 760, and a fill-in field 770 is available to enter a one-time password, and a "Submit" button 780 allows the user to submit the OTP. As discussed above, the OTP that is to be submitted correspond to the login instance; namely, a third login into the remote server indicated in 760 would require the third OTP in list 610. The relevant instance is displayed to the user in indicator 790. In FIG. 7B, the first OTP is indicated, and the OTP field has been filled accordingly (see FIG. 6).

Once the "Submit" button 780 is clicked, the actual login URL is displayed (not shown) with user name and password fields filled, as discussed above. Upon proceeding with login in the actual login URL, a decryption component (e.g., encryption/decryption component 148) generates the true password and a proxy component (e.g., proxy component 154) replaces the OTP "vlxnPDM4" with the true password "HardPWD1" and logins the user.

FIGS. 8-11 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

Figure 8:
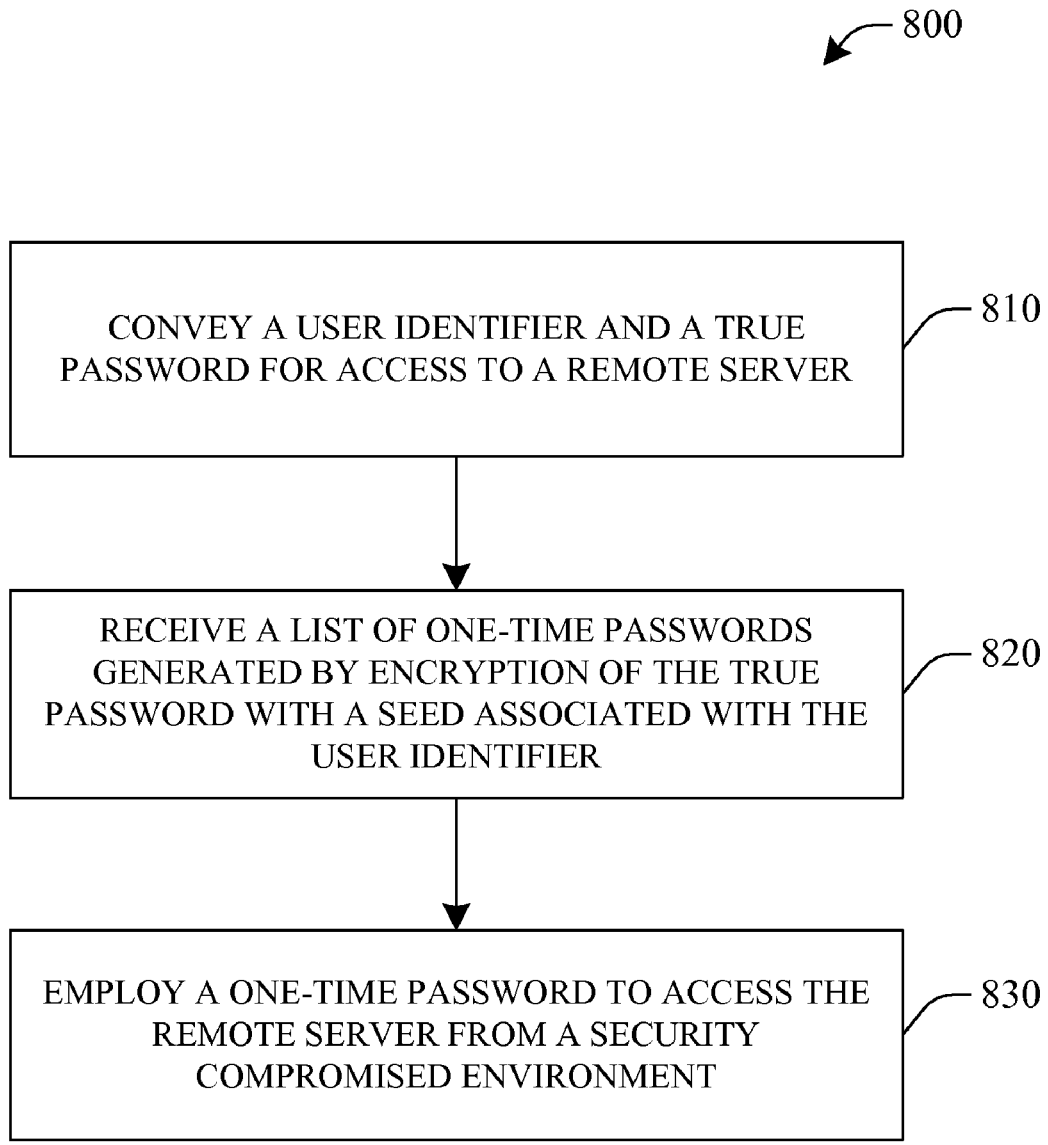
FIG. 8 presents a flowchart of a method to generate a one-time password.

FIG. 8 presents a flowchart of a method 800 to generate a one-time password. At act 810, information consisting of a user identifier and a true password for access to a remote server is conveyed. In an aspect, the information is conveyed to an intermediary component such as one-time password component 140 (FIG. 1) or to a one-time password generation component, e.g., component 470 (FIG. 4). At act 820, a list of one-time passports is received, the list generated by encryption of the conveyed true password using a seed assigned to the conveyed user identifier. At act 830, a one-time password is used to access a remote, password protected login server. In an aspect, such login is accomplished employing a one-time password component such as 140 (FIG. 1) or 440 (FIG. 4).

Figure 9:
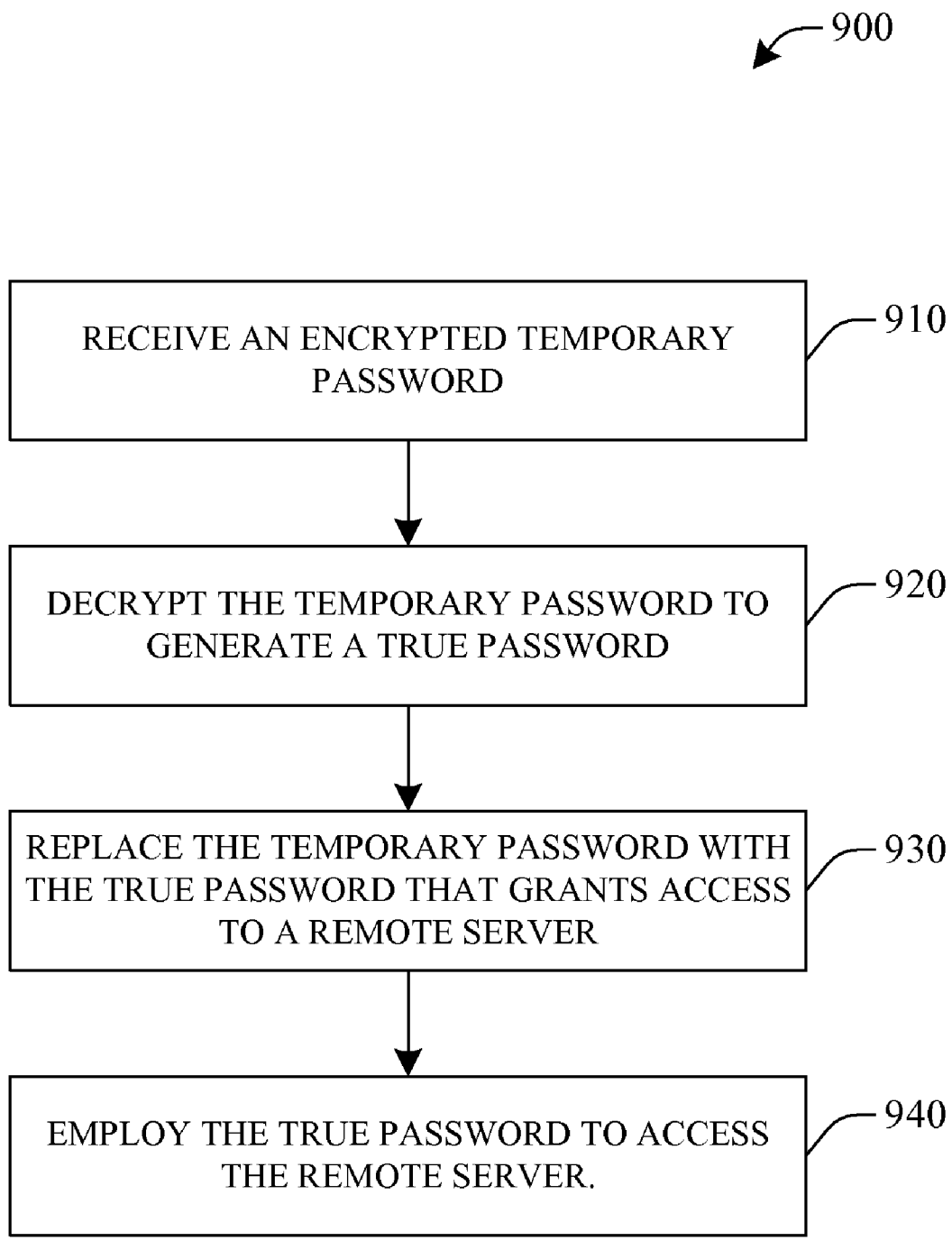
FIG. 9 presents a flowchart of a method to login in a remote password-protected server using a one-time password.

FIG. 9 presents a flowchart of a method 900 to login in a remote password-protected server using a temporary password. At 910 a temporary password is received. It should be appreciated that a temporary password can be employed a predetermined number of instances, the specific number of instances determined at the time of generating the temporary password and dictated by the entity that issued the temporary password. Additionally the number of instances can numerable (e.g., U instances, with U a natural number), or bounded by a password lifetime (e.g., the temporary password expires a time $\Delta\tau$ after being generated). Such password can be received/processed by an intermediary component, such as one-time-password component 140 (FIG. 1) or 440 (FIG. 4), as a result of a client (e.g., client 120) attempting to login in a password-protected remote server. In such a situation, component 140 or 440 can be redesigned to handle U instances of the same temporary password, or to handle the same temporary password for a finite period of time. Changes can primarily take place in the encryption/decryption component 148 of one-time password component 140, or the decryption component 458 of embodiment 400. Such changes can be directed toward generating the same decryption of the temporary password, which can be attained by retaining the same seed k for the lifetime of the password, rather that changing seeds in every decryption instance. The client attempting login can be considered untrusted, which can be the reason why it handles a temporary password instead of a true password. At 920 the temporary password is decrypted to generate a true password. In an aspect, the decryption can be carried out by an encryption/decryption component such as 148 (FIG. 1) or a decryption component, e.g., 448 (FIG. 4). At act 930 the true password, which grants access to a remote server, replaces the one-time password. Replacement can be effected by a proxy component 154 as describe above in reference to FIG. 1. At act 940, the true password is employed to access the remote server.

Figure 10:
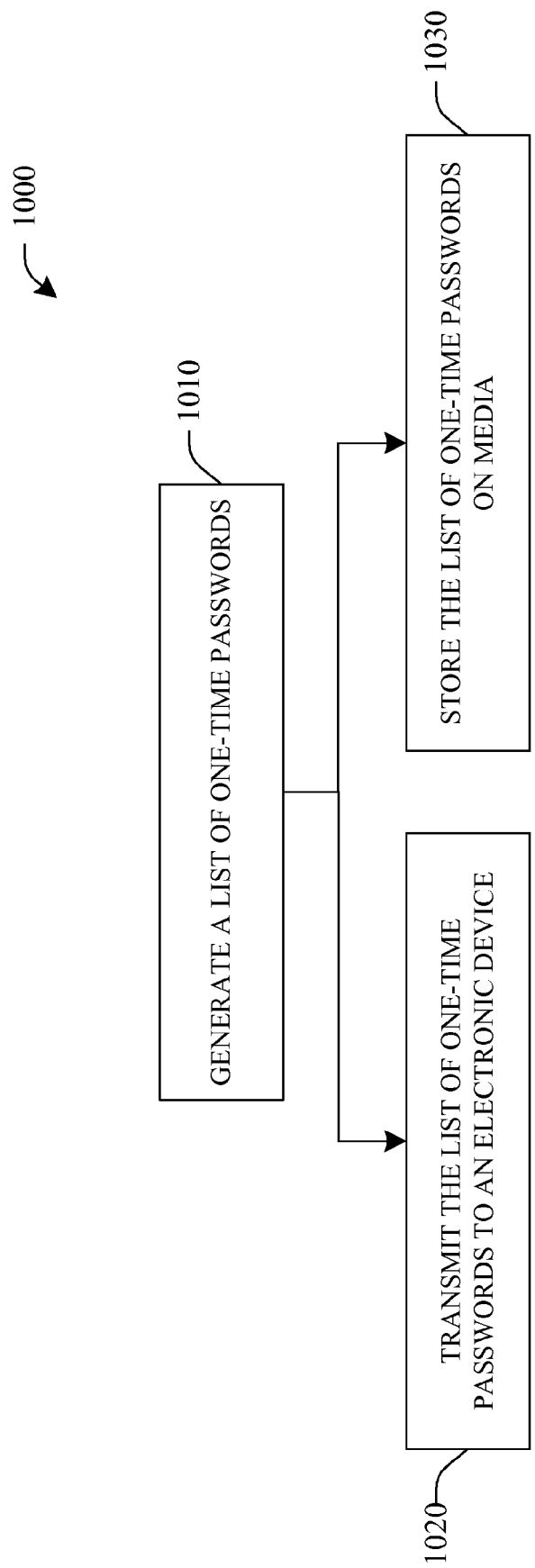
FIG. 10 presents a flowchart of a method to manipulate a list of one-time passwords.

FIG. 10 presents a flowchart of a method 1000 to manipulate a list of one-time passwords. At act 1010 a list of one-time passwords is generated. In an aspect, generation of a one-time password can be accomplished by carrying out method 800 above. At act 1020 the list of one-time passwords is transmitted to an electronic device such as courier component 290. At act 1030, the list of passwords is stored in media. As discussed above media can comprise paper, smart paper, flexible displays, CDs and DVDs. In an aspect, storing the one-time passwords can comprise embedding those one-time passwords with security features (e.g., voice signature) or encrypting those OTPs at the time are downloaded into media.

Figure 11:
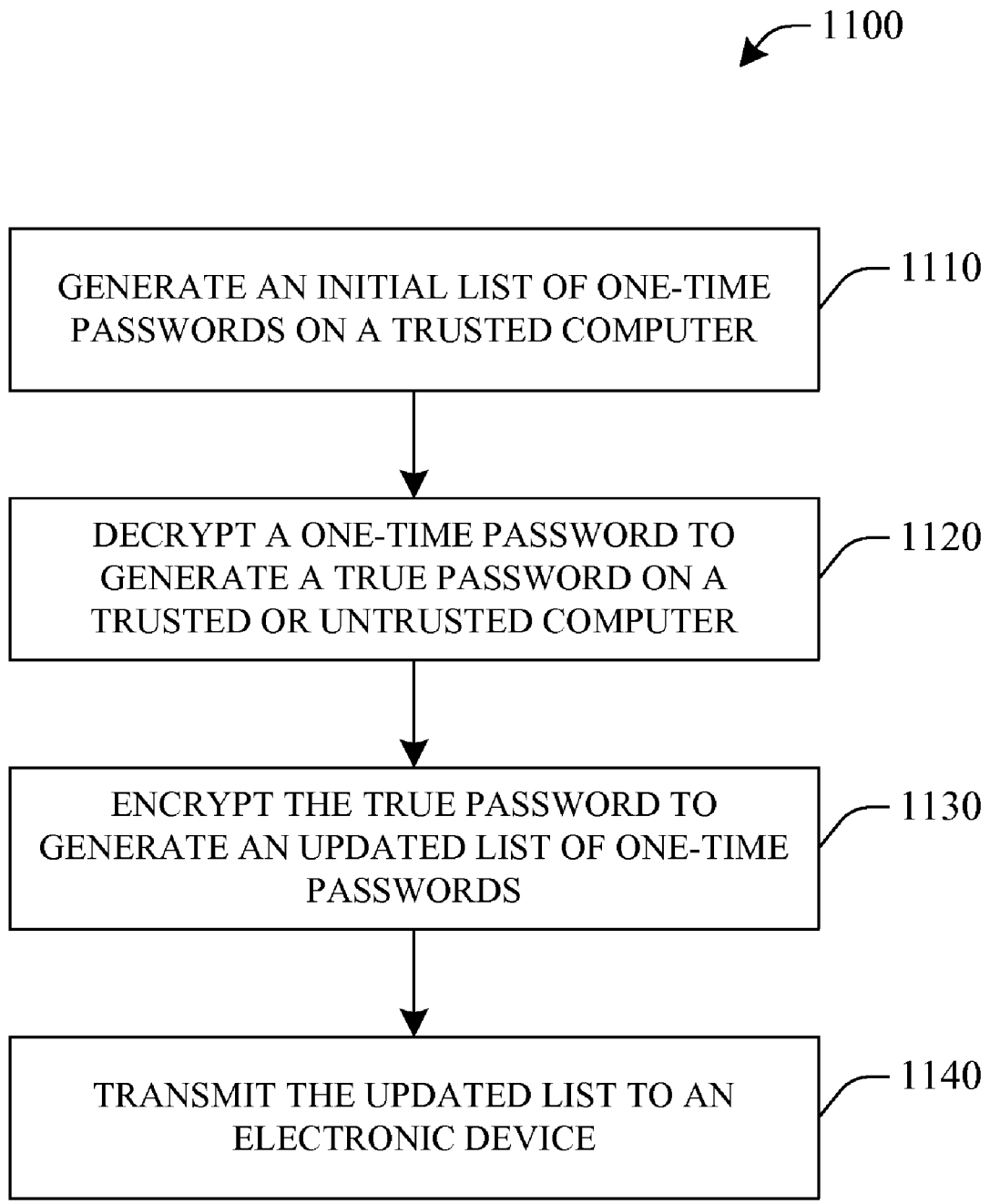
FIG. 11 presents a flowchart of a method to update a list of one-time passwords.

FIG. 11 presents a flowchart of a method 1100 to update a list of one-time passwords. At 1110, a first list of one-time passwords is generated on a trusted computer. Such list can be generated as discussed above in connection with method 800. At 1120, a one-time password is decrypted to produce a true password. This act can be carried out in a trusted or untrusted computer. In an aspect, the only requisite to this generation act is accessing a secure encryption/decryption component (e.g., 148) to carry out the act. To generate an updated list of one-time passwords, a mapping of the true password is effected in act 1130. As discussed above, the mapping can consist of one-to-one and onto random permutations of the characters of the true password. It should be appreciated that in this case, in act 1130, the seed employed to generate the first list of OTPs needs to be updated in order to produce a distinct set of mappings. At act 1140, the updated list is transmitted to an electronic device (e.g., courier device 290). Since the electronic device is not available to spyware running on the untrusted machine, a user can thus generate arbitrary numbers of OTPs. In a scenario in which a user's OPT active passwords are nearly exhausted, the user can transmit one of the last few, or the last, OTP to an encryption/decryption component (e.g., component 148) which then decrypt the OTP, generate a new seed, and send an updated list of one-time-passwords based on the new seed. As an example, if the electronic device is a cell phone, the new OTPs can be sent using SMS text messages. It is noted that returning to a trusted machine to get additional OTPs is not necessary if the one-time passwords are stored on a device which can receive messages from a one-time password component (e.g., component 140).

Figure 12:
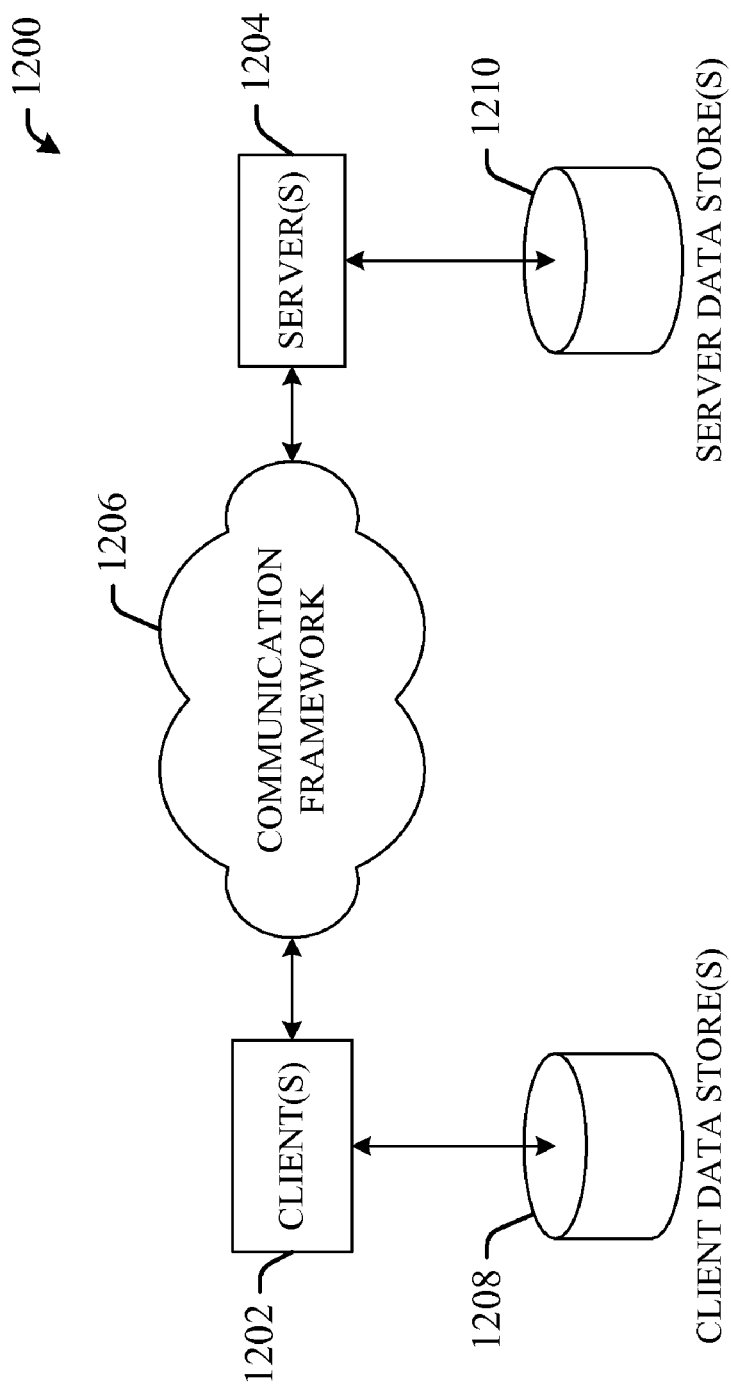
FIGS. 12 and 13 illustrate example computing environments for carrying out various aspects described herein.

FIG. 12 illustrates a schematic block diagram of a computing environment 1200 in accordance with the subject specification. The system 1200 includes one or more client(s) 1202. The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 304 can also be hardware and/or software (e.g., threads, processes, computing devices). The servers 304 can house threads to perform transformations by employing the specification, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

Figure 13:
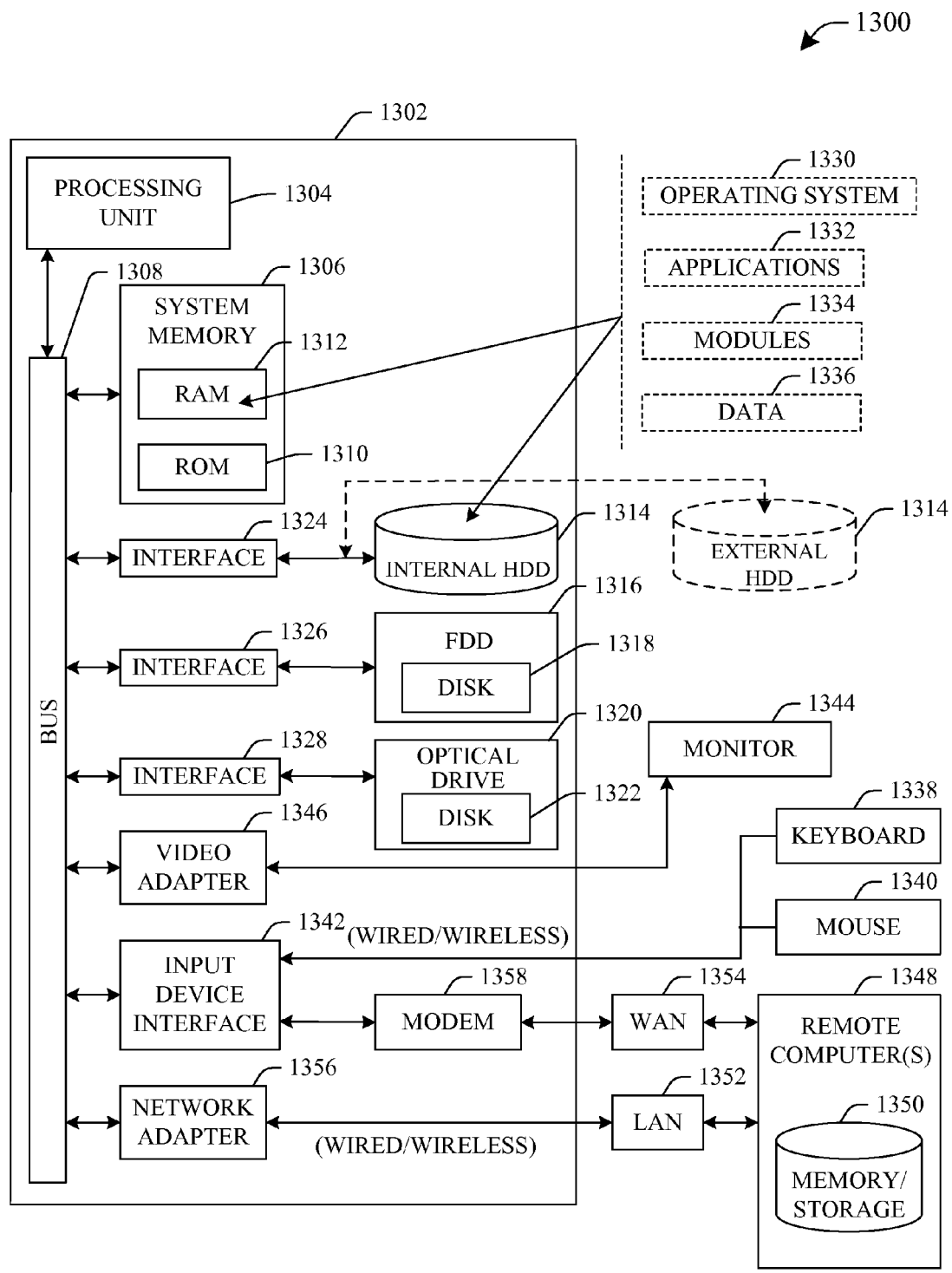

FIG. 13 illustrates a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 418) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What it is claimed is:

1. A computer system that facilitates one-time password access to a password-protected remote login server, the computer system comprising:
   one or more processors; and
   a memory that includes a plurality of computer-executable components executable by the one or more processors, the plurality of computer-executable components comprising:
      a registration component that receives a true password and an account identifier for an account, the account identifier including an user identifier and one of a uniform resource locator or an internet protocol address of the account, the registration component further associates the account identifier with a unique seed value;

an encryption/decryption component that generates a list of one-time passwords for accessing the account by at least encrypting the true password with the unique seed value, and that further receives a one-time password entered by a user that is selected from the list of one-time passwords and decrypts the one-time password using at least the unique seed value resulting in the true password; and a proxy component that replaces the one-time password with the true password for obtaining access to the account.

2. The system of claim 1, wherein the encryption/decryption component generates the list of one-time passwords by at least encrypting the unique seed value and the true password with a specific encryption key or encryption method.

3. The system of claim 2, wherein the encryption method includes a mapping of a set of true password characters of the true password to the set such that each non-numeric character of the true password maps to a different non-numeric character selected from the set and each numeric character of the true password maps to a different numeric character selected from the set.

4. The system of claim 2, wherein the encryption/decryption component maps subsets of characters of the true password onto themselves.

5. The system of claim 2, wherein the encryption/decryption component maps each character of the true password into a K-digit number, with K being an integer greater than one.

6. The system of claim 2, wherein the encryption/decryption component transmits the list of one-time passwords to an electronic device.

7. The system of claim 1, wherein the encryption/decryption component is deployed on a trusted computer.

8. The system of claim 7, wherein the account is located on a remote server that is networked to the computer system.

9. The system of claim 1, wherein the true password is at least one of a credit card number, a social security number, or an alphanumeric password.

10. A computer-implemented method, comprising:
receiving, at an encryption/decryption component, a one-time password entered by a user for accessing an account, the one-time password being previously generated using the encryption/decryption component by at least encrypting a unique seed value with a true password, the unique seed value representing a combination of a login user identifier and one of a uniform resource locator or an internet protocol address for the account;
decrypting, at the encryption/decryption component, the one-time password using at least the unique seed value resulting in the true password;
replacing the one-time password with the true password; and
employing the true password for login to the account, wherein the one-time password is one of a list of one-time passwords.

11. The method of claim 10, wherein the one-time password is generated by further mapping characters of the true password using a pseudorandom permutation sequence.

12. The method of claim 11, wherein the one-time password is one of the list of one-time passwords that are valid for a predetermined number of login instances, the predetermined number being a natural number.

13. The method of claim 12, further comprising transmitting the list of one-time passwords to an electronic device.

14. The method of claim 11, further comprising validating that the mapping satisfies Luhn's algorithm when the true password is a credit card number.

15. The method of claim 10, further comprising receiving the combination of the login user identifier and one of the uniform resource locator or the internet protocol address for the account.

16. The method of claim 15, where in the account is located on a remote server.

17. The method of claim 10, further comprising generating one or more new one-time passwords by at least encrypting the true password decrypted from the one-time password with the unique seed value.

18. A computer-readable memory having stored thereon computer executable instructions for performing various acts, comprising:
prompting a user for input of a one-time password from a sequence of one-time passwords that corresponds to a particular login instance in a sequence of login instances for a remote server, each one-time password generated, at an encryption/decryption component, by encrypting a corresponding unique seed value with a true password, each unique seed value being assigned to a combination of a login user identifier and one of a uniform resource locator or an internet protocol address for the account;
receiving, at the encryption/decryption component, the one-time password that corresponds to the particular login instance;
decrypting, at the encryption/decryption component, the one-time password using at least the corresponding unique seed value resulting in the true password;
replacing the one-time password with the true password that grants access to the remote server; and
employing the true password for login to the remote server.

* * * * *